(12) United States Patent
Kotake et al.

(10) Patent No.: US 10,175,346 B2
(45) Date of Patent: Jan. 8, 2019

(54) LASER RADAR APPARATUS AND WIND VELOCITY OBSERVATION METHOD

(71) Applicant: Mitsubishi Electric Corporation, Tokyo (JP)

(72) Inventors: Nobuki Kotake, Tokyo (JP); Shumpei Kameyama, Tokyo (JP); Yasuhisa Tamagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/572,758

(22) PCT Filed: May 12, 2015

(86) PCT No.: PCT/JP2015/063619
§ 371 (c)(1),
(2) Date: Nov. 8, 2017

(87) PCT Pub. No.: WO2016/181493
PCT Pub. Date: Nov. 17, 2016

(65) Prior Publication Data
US 2018/0156893 A1    Jun. 7, 2018

(51) Int. Cl.
*G01S 7/487* (2006.01)
*G01S 17/58* (2006.01)
(Continued)

(52) U.S. Cl.
CPC ............... *G01S 7/487* (2013.01); *G01P 5/26* (2013.01); *G01S 7/4808* (2013.01); *G01S 17/58* (2013.01); *G01S 17/95* (2013.01); *Y02A 90/19* (2018.01)

(58) Field of Classification Search
CPC .......... G01S 17/42; G01S 17/58; G01S 17/95; G01S 7/487; G01S 7/4808; G01S 7/4817;
(Continued)

(56) References Cited

U.S. PATENT DOCUMENTS

2007/0171396 A1    7/2007   Harris et al.
2007/0171397 A1    7/2007   Halldorsson et al.
(Continued)

FOREIGN PATENT DOCUMENTS

JP     H10-187016 A      7/1998
JP     2002-168948 A     6/2002
(Continued)

OTHER PUBLICATIONS

Written Opinion issued in PCT/JP2015/063619; dated Aug. 11, 2015.
(Continued)

*Primary Examiner* — John H Le
(74) *Attorney, Agent, or Firm* — Studebaker & Brackett PC

(57) ABSTRACT

A wind velocity searching unit 30 is configured so as to, when a spectrum signal calculated by a spectrum calculating unit 22 is one in a range bin having a signal strength less than a first threshold $Th_1$, determine a search center IF of the search scope for a Doppler frequency corresponding to a wind velocity in the range bin by using a wind velocity model selected by a wind velocity model selecting unit 29, and search for the wind velocity in the range bin from the spectrum signal within the search scope whose search center IF is determined thereby. As a result, the probability that the peak of noise is detected erroneously as the peak of the spectrum signal is reduced.

6 Claims, 10 Drawing Sheets

(51) Int. Cl.
*G01S 7/48* (2006.01)
*G01S 17/95* (2006.01)
*G01P 5/26* (2006.01)

(58) Field of Classification Search
CPC ...... G01S 7/4818; G01S 7/484; G01S 7/4868; Y02A 90/19
USPC ...................... 702/3; 356/28, 28.5; 342/26 B
See application file for complete search history.

(56) References Cited

U.S. PATENT DOCUMENTS

| | | |
|---|---|---|
| 2010/0245164 A1 | 9/2010 | Kauffman |
| 2015/0146191 A1* | 5/2015 | Kotake ................... G01S 17/42 356/28.5 |
| 2015/0185328 A1 | 7/2015 | Kotake et al. |

FOREIGN PATENT DOCUMENTS

| | | |
|---|---|---|
| JP | 2002-267753 A | 9/2002 |
| JP | 2005-351853 A | 12/2005 |
| JP | 2006-284260 A | 10/2006 |
| JP | 2007-538245 A | 12/2007 |
| JP | 2009-162678 A | 7/2009 |
| JP | 2010-190772 A | 9/2010 |
| JP | 2010-230613 A | 10/2010 |
| JP | 2010-243483 A | 10/2010 |
| WO | 2014/041852 A1 | 3/2014 |

OTHER PUBLICATIONS

International Search Report issued in PCT/JP2015/063619; dated Aug. 11, 2015.
"Radar Remote Sensing of Weather and Atmosphere"; pp. 1-6; ISBN 4-87698-653-3; 2005.

* cited by examiner

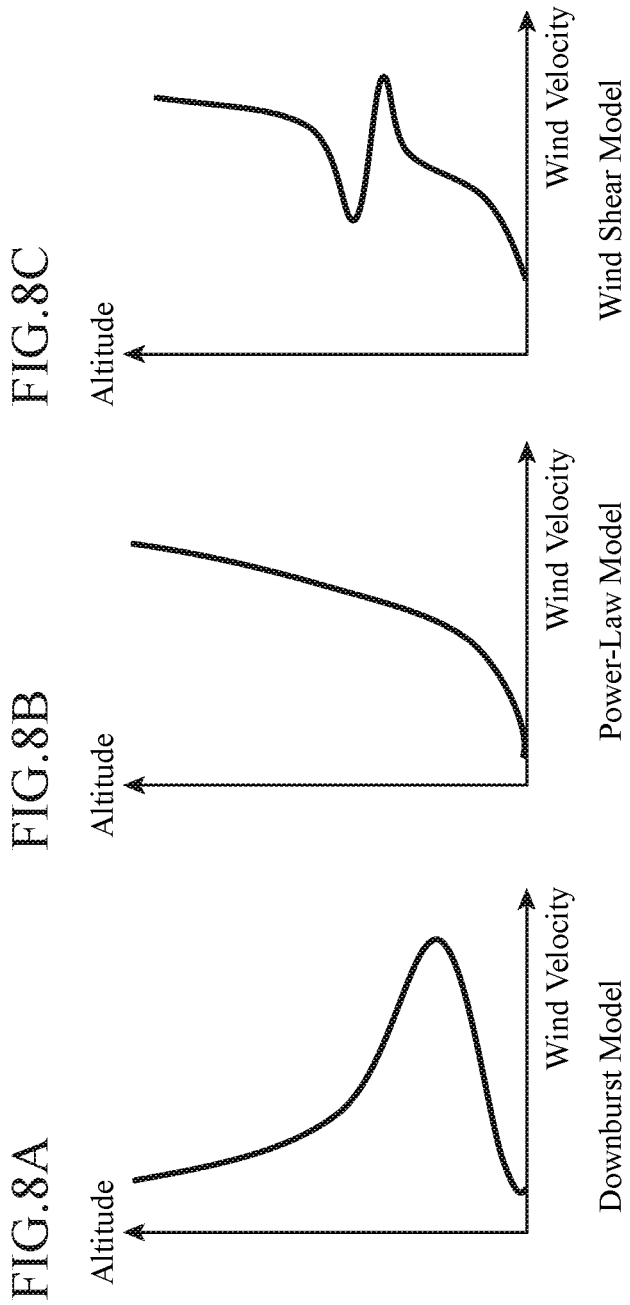

● Wind Velocity in Range Bin in High SNR Area
— Wind Velocity Model
⟷ Search Scope

LASER RADAR APPARATUS AND WIND VELOCITY OBSERVATION METHOD

TECHNICAL FIELD

The present invention relates to a laser radar apparatus for and a wind velocity observation method of observing wind velocities in an atmosphere.

BACKGROUND ART

As a device for measuring the position of an object that exists at a distant point, a radar apparatus is known.

A radar apparatus emits a wave, such as an electromagnetic wave or acoustic wave, into space, receives a wave that is reflected from an observation object and returned back, and analyzes the returned wave to measure a distance from the radar apparatus to the object and an angle of the object.

Among radar apparatuses, a weather radar apparatus is known. A weather radar apparatus observes a very small aerosol floating in the atmosphere, and measures, as a wind velocity, a velocity at which an aerosol moves from an amount of phase rotation of a wave that is reflected from the aerosol and returned back.

Particularly, among weather radar apparatuses, a laser radar apparatus using light as an electromagnetic wave is used as a wind direction and wind velocity radar because the laser radar apparatus has a very small divergence of a beam emitted and therefore can observe an object with a high angular resolution (for example, refer to Nonpatent Literature 1).

A typical laser radar apparatus emits laser light into the atmosphere, after that, receives the laser light which is reflected by an aerosol in the atmosphere and then returns thereto, i.e., the laser light which has received a Doppler frequency shift that depends on the moving velocity of the aerosol in the atmosphere, and performs heterodyne detection on the laser light and local light, thereby detecting a Doppler signal corresponding to a wind velocity.

Such a laser radar apparatus is generally called a Doppler lidar, and divides a laser light beam which is reflected by an aerosol at each altitude in the atmosphere and then returns thereto into laser light beams with respect to time, and performs coherent integration in very small spaces within each of range bins corresponding to the laser light beams separate with respect to time.

When performing the coherent integration within each of the range bins, the laser radar apparatus needs to shorten a unit time with which the laser radar apparatus divides the laser light beam in order to grasp spatial variations in wind velocities in detail, because the unit time with which the laser radar apparatus divides the laser light beam corresponds to the distance resolution. However, because the signal amount acquired decreases when the time required for the coherent integration is shortened, there is a trade-off relationship between the time required for the coherent integration and the distance up to which observations can be performed, i.e., the distance becomes short with decrease in the time required for the coherent integration.

In order to prevent the distance up to which observations can be performed from becoming short even if the time required for the coherent integration is shortened, there is a method of improving the signal to noise ratio (referred to as the "SNR" from here on) by performing the coherent integration, after that, performing a Fourier transform on a coherent integrated result within each of the range bins, and then performing incoherent integration on a result of the Fourier transform. It is known that the SNR is improved generally by $\sqrt{N}$ when the incoherent integration is performed N times (for example, refer to Patent Literatures 1 and 2).

When acquiring a spectrum signal by performing coherent integration within each of the range bins, a typical laser radar apparatus specifies a Doppler shift amount which is a frequency at which the spectrum signal has a maximum, and calculates a wind velocity from the Doppler shift amount.

Therefore, if a Doppler shift amount which is a frequency at which the spectrum signal has a maximum can be specified with a high degree of accuracy, the calculation accuracy of a wind velocity can be improved, but an area (high SNR area) of distances with a high SNR and an area (low SNR area) of distances with a low SNR usually coexist.

Although in the high SNR area it is possible to calculate a wind velocity correctly because the spectrum signal has a higher peak than noise, in the low SNR area noise may have a higher peak than the spectrum signal. Therefore, in the low SNR area, the peak of noise may be detected erroneously as the peak of the spectrum signal, and an incorrect wind velocity may be calculated.

In the following Patent Literature 3, a laser radar apparatus that, when searching for the peak of a spectrum signal, determines a standard deviation of wind velocities between the gate (distance) of a high SNR area and that of a low SNR area adjacent to the high SNR area, and determines a peak search scope within which to search for the peak of the spectrum signal by using the standard deviation is disclosed.

Because, as a result, the range within which to search for the peak of the spectrum signal is limited, the probability that the peak of noise is detected erroneously as the peak of the spectrum signal is decreased.

CITATION LIST

Patent Literature

Patent Literature 1: Japanese Unexamined Patent Application Publication No. 2006-284260 (paragraph number [0013])

Patent Literature 2: Japanese Unexamined Patent Application Publication No. 2002-168948 (paragraph number [0029])

Patent Literature 3: Japanese Unexamined Patent Application Publication No. 2009-162678 (paragraph number [0028])

Non Patent Literature

Non Patent Literature 1: Radar Remote Sensing of Weather and Atmosphere ISBN 4-87698-653-3

SUMMARY OF INVENTION

Technical Problem

Because conventional laser radar apparatuses are configured as above, the range within which to search for the peak of a spectrum signal is limited, but the search center of a search scope within which there is a high possibility that the peak of the spectrum signal exists is not determined. Therefore, it is necessary to determine a certain large search scope in order not to overlook the peak of the spectrum signal, even if the range within which to search for the peak of the spectrum signal is limited. A problem is, however, that when a large search scope is determined, the probability that the peak of noise is detected erroneously as the peak of the spectrum signal is increased.

The present invention is made in order to solve the above-mentioned problem, and it is therefore an object of the present invention to provide a laser radar apparatus and a wind velocity observation method capable of reducing the probability that the peak of noise is detected erroneously as the peak of a spectrum signal, and calculating a wind velocity with a high degree of accuracy.

Solution to Problem

According to the present invention, there is provided a transmission and reception optical system for emitting a pulse into an atmosphere, and receiving reflected light of the pulse that is reflected from an observation object and returned back; a spectrum calculating unit for calculating a spectrum signal in range bins from the reflected light received by the transmission and reception optical system; a wind velocity calculating unit for, when a signal strength in a range bin for which a spectrum signal that is calculated by the spectrum calculating unit is equal to or greater than a first threshold, calculating a wind velocity in the range bin which is a velocity of the observation object from the spectrum signal; a wind velocity model selecting unit for selecting a wind velocity model corresponding to wind velocities in the range bins that are calculated by the wind velocity calculating unit from a plurality of wind velocity models each showing a relationship between range bins and wind velocities in the atmosphere; and a wind velocity searching unit for, when a signal strength in a range bin for which a spectrum signal that is calculated by the spectrum calculating unit is less than the first threshold, determining a search center of a search scope for a Doppler frequency corresponding to a wind velocity in the range bin by using the wind velocity model selected by the wind velocity model selecting unit, and searching for a wind velocity in the range bin from the spectrum signal within the search scope whose search center is determined.

Advantageous Effects of Invention

Because the wind velocity searching unit according to the present invention is configured so as to, when a spectrum signal calculated by the spectrum calculating unit is one in a range bin having a signal strength less than the first threshold, determine the search center of the search scope for a Doppler frequency corresponding to a wind velocity in the range bin by using the wind velocity model selected by the wind velocity model selecting unit, and search for the wind velocity in the range bin from the spectrum signal within the search scope whose search center is determined thereby, there is provided an advantage of being able to reduce the probability that the peak of noise is detected erroneously as the peak of the spectrum signal, and calculate the wind velocity with a high degree of accuracy.

BRIEF DESCRIPTION OF DRAWINGS

FIGS. 8A through 8C are explanatory drawings showing a downburst model, a power rule model and a wind shear model.

DESCRIPTION OF EMBODIMENTS

Hereafter, in order to explain this invention in greater detail, embodiments of the present invention will be described with reference to the accompanying drawings.

Embodiment 1

Figure 1:
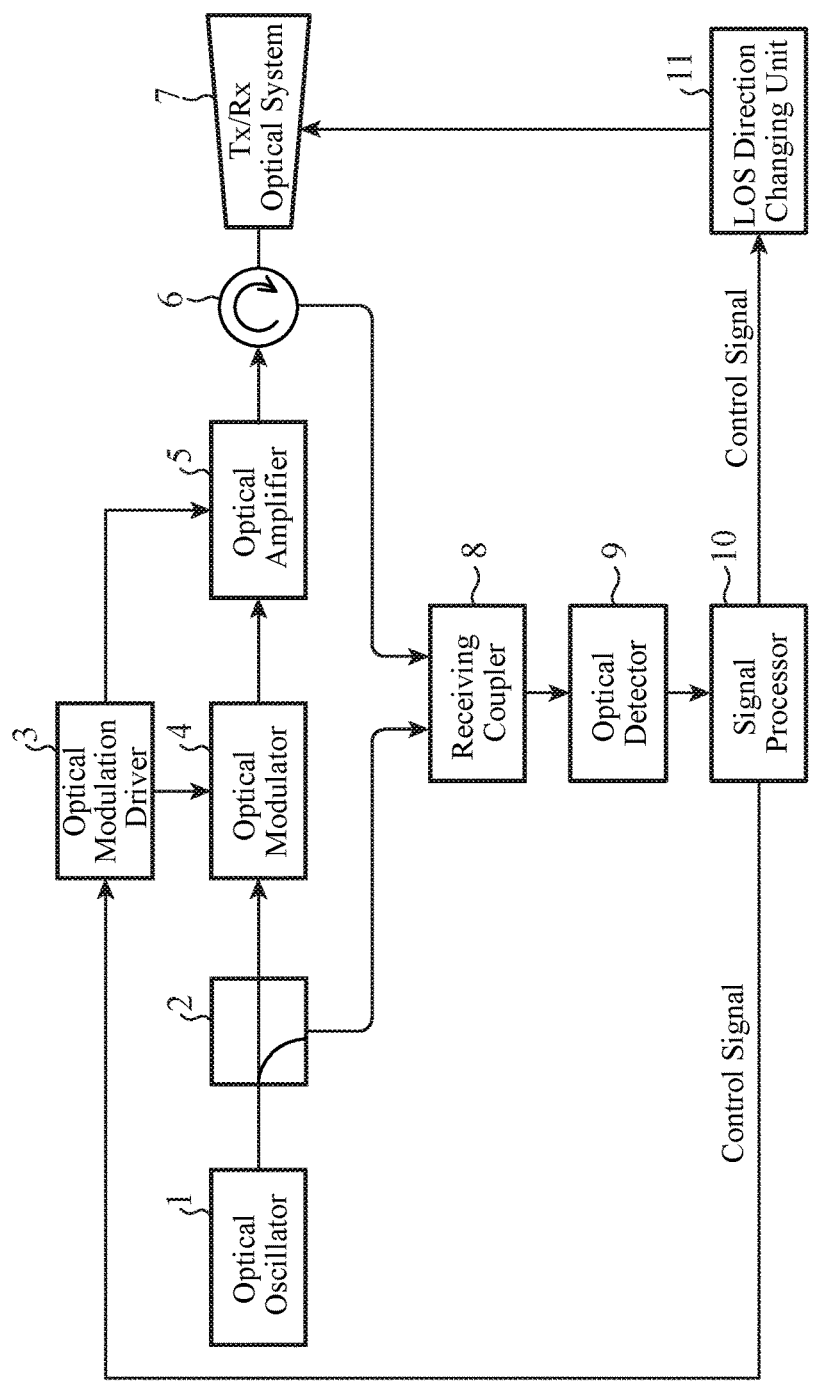
FIG. 1 is a block diagram showing a laser radar apparatus according to Embodiment 1 of the present invention.

FIG. 1 is a block diagram showing a laser radar apparatus according to Embodiment 1 of the present invention.

In FIG. 1, an optical oscillator 1 is an optical oscillator for generating laser light.

An optical coupler 2 splits the laser light generated by the optical oscillator 1 into transmission light and local light, and outputs the transmission light to an optical modulator 4 and also outputs the local light to a receiving coupler 8.

An optical modulation driver 3 controls pulse modulation to be performed by the optical modulator 4 and also controls the amplification factor of an optical amplifier 5, in accordance with control signals outputted from a signal processor 10.

The optical modulator 4 is configured with an optic modulator, such as an Acousto-Optic Modulator (AOM), and outputs a pulse by performing pulse modulation on the transmission light outputted from the optical coupler 2 under the control of the optical modulation driver 3.

The amplification factor of the optical amplifier 5 is controlled by the optical modulation driver 3, and the optical amplifier 5 amplifies the pulse outputted from the optical modulator 4 with the amplification factor and outputs the amplified pulse to a circulator 6.

While the circulator 6 outputs the pulse outputted from the optical amplifier 5 to a transmission and reception (Tx/Rx) optical system 7, the circulator 6 outputs received light which is received by the Tx/Rx optical system 7 and which is reflected light of the pulse to the receiving coupler 8.

The line-of-sight direction, i.e., emitting direction of the pulse, of the Tx/Rx optical system 7 is changed by a line-of-sight (LOS) direction changing unit 11, and the Tx/Rx optical system 7 emits the pulse outputted from the circulator 6 into the atmosphere, and, after that, receives reflected light of the pulse that is reflected from an aerosol, which is an observation object, and returned back.

The receiving coupler 8 combines the local light outputted from the optical coupler 2 and the received light outputted from the circulator 6, thereby outputting combined light having a frequency which is the addition of the frequency of the local light and the frequency of the received light to an optical detector 9.

The optical detector 9 is configured with, for example, a balanced receiver, and converts the combined light outputted from the receiving coupler 8 into an electric signal and outputs the electric signal to the signal processor 10.

The signal processor 10 analyzes, for each LOS direction, electric signals outputted from the optical detector 9 to calculate a wind velocity which is a moving velocity of an aerosol, and also outputs control signals for controlling the optical modulation driver 3 and the LOS direction changing unit 11.

The LOS direction changing unit 11 is a device for changing the LOS direction of a pulse to be emitted from the Tx/Rx optical system 7 in accordance with a control signal outputted from the signal processor 10.

Figure 2:
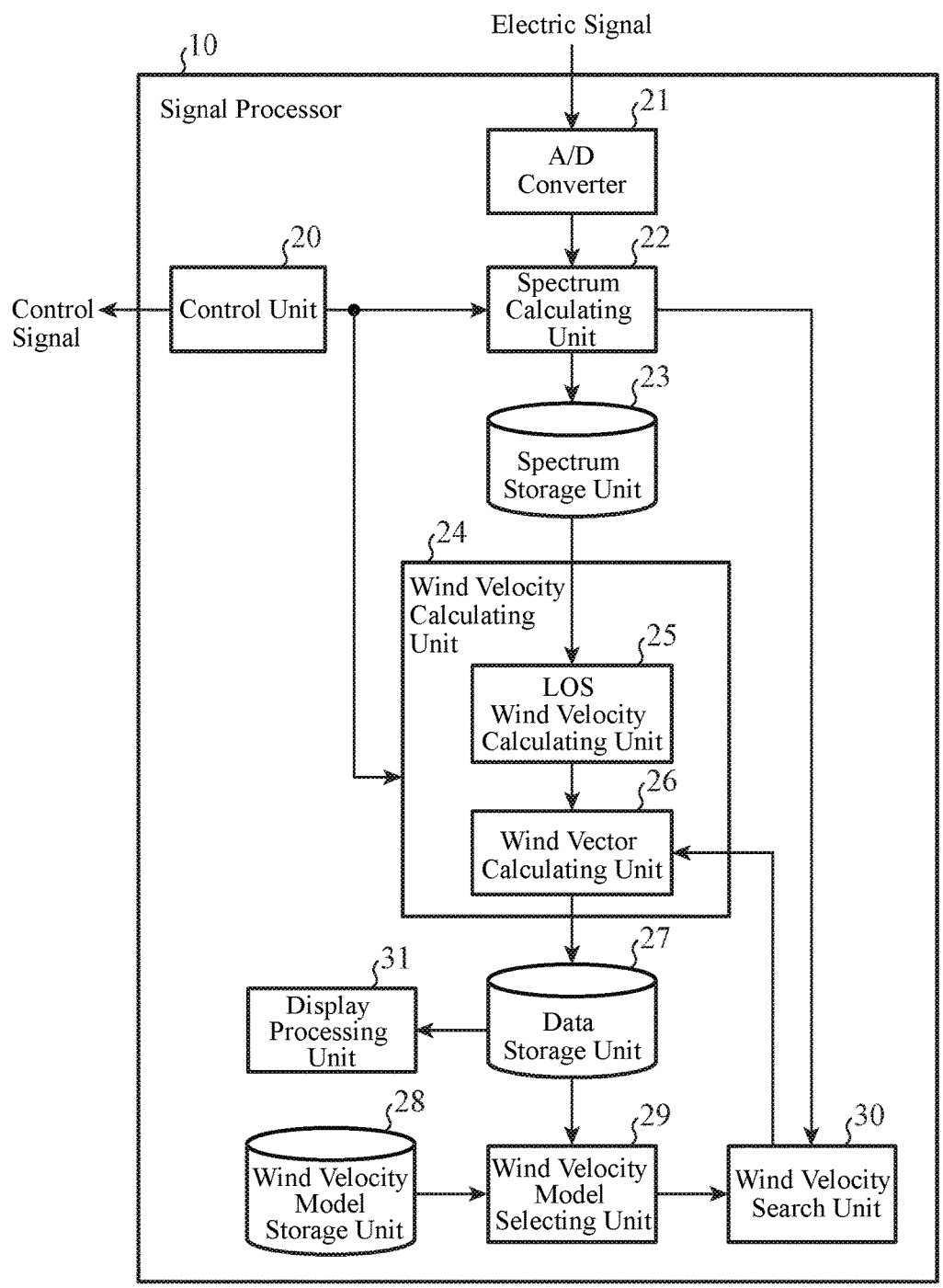
FIG. 2 is a block diagram showing a signal processing 10 of the dual polarization radar apparatus according to Embodiment 1 of the present invention.

FIG. 2 is a block diagram showing the signal processor 10 of the laser radar apparatus according to Embodiment 1 of the present invention.

In FIG. 2, a control unit 20 outputs a control signal showing the pulse width of a pulse to be emitted, the amplification factor of the pulse, etc., to the optical modulation driver 3, and also outputs a control signal showing the LOS direction of the pulse to the LOS direction changing unit 11. The control unit 20 further outputs the control signal showing the LOS direction of the pulse to a spectrum calculating unit 22 and a wind velocity calculating unit 24.

An A/D converter 21 is an analog to digital converter that converts each electric signal outputted from the optical detector 9 into a digital signal.

Every time the LOS direction is changed by the LOS direction changing unit 11, the spectrum calculating unit 22 performs a process of splitting a digital signal converted by the A/D converter 21 according to a time, and performing a Fourier transform on each digital signal split according to the time, i.e., the digital signal in each range bin, and thereby calculating a spectrum signal in each range bin for a LOS direction of interest.

The spectrum calculating unit 22 also performs an incoherent integration (integration process) of adding spectrum signals for each range bin, thereby improving the signal to noise ratio (SNR) of the spectrum signal in each range bin.

A spectrum storage unit 23 is implemented using a storage device, such as a RAM or hard disk, and stores the spectrum signals calculated by the spectrum calculating unit 22 for each range bin.

The wind velocity calculating unit 24 is configured with a LOS wind velocity calculating unit 25 and a wind vector calculating unit 26, and performs a process of, when a spectrum signal calculated by the spectrum calculating unit 22 is one in a range bin having a signal strength equal to or greater than a preset threshold $Th_1$ (first threshold), calculating a wind velocity in the range bin which is the moving velocity of an aerosol from the spectrum signal calculated by the spectrum calculating unit 22.

For each LOS direction of pulse, when a spectrum signal calculated by the spectrum calculating unit 22 is one in a range bin having a signal strength equal to or greater than the preset threshold $Th_1$, the LOS wind velocity calculating unit 25 performs a process of calculating a LOS wind velocity in the range bin from the spectrum signal calculated by the spectrum calculating unit 22.

From the LOS wind velocities in range bins that are calculated for each LOS direction by the LOS wind velocity calculating unit 25 and are having a signal strength equal to or greater than the threshold $Th_1$, the wind vector calculating unit 26 performs a process of calculating a wind velocity for a range bin of interest.

A data storage unit 27 is implemented as a storage device, such as a RAM or a hard disk, and stores the wind velocities calculated by the wind vector calculating unit 26.

A wind velocity model storage unit 28 is implemented as a storage device, such as a RAM or a hard disk, and stores, as wind velocity models showing a relationship between altitudes (range bins) and wind velocities in the atmosphere, for example, a "downburst model", a "power-law model" and a "wind shear model."

A relationship between altitudes and wind velocities changes greatly dependently on seasons (times) and areas, and the parameters of each wind velocity model change greatly dependently on times and areas.

A wind velocity model selecting unit 29 performs a process of calculating a degree of matching to each of the plural wind velocity models stored in the wind velocity model storage unit 28 from the wind velocity in each of the range bins stored in the data storage unit 27, comparing the degrees of matching to the plural wind velocity models with one another, and selecting a wind velocity model corresponding to the wind velocities in the range bins on the basis of a result of the comparison among the degrees of matching.

More specifically, the wind velocity model selecting unit 29 performs a process of selecting, as the wind velocity model corresponding to the wind velocities in the range bins, the wind velocity model with the highest degree of matching from the plural wind velocity models stored in the wind velocity model storage unit 28.

When a spectrum signal calculated by the spectrum calculating unit 22 is one in a range bin having a signal strength less than the preset threshold $Th_1$, a wind velocity searching unit 30 performs a process of determining a search center of a search scope for a Doppler frequency corresponding to the wind velocity in the range bin by using the wind velocity model selected by the wind velocity model selecting unit 29, and searching for a wind velocity in the range bin from the spectrum signal within the search scope whose search center is determined thereby.

A display processing unit 31 performs a process of displaying the wind velocity in each of the range bins stored in the data storage unit 27.

In the example of FIG. 2, it is contemplated that each of the following components: the control unit 20, the spectrum calculating unit 22, the wind velocity calculating unit 24, the wind velocity model selecting unit 29, the wind velocity searching unit 30 and the display processing unit 31, which are components of the signal processor 10, is implemented as hardware for exclusive use. As the hardware for exclusive use, for example, a semiconductor integrated circuit equipped with a CPU, a one chip microcomputer or the like can be considered.

Figure 3:
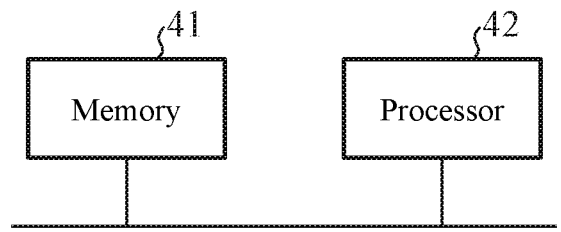
FIG. 3 is a hardware block diagram in a case in which the signal processor 10 consists of a computer.

Instead, the signal processor 10 can be implemented as a computer. FIG. 3 is a hardware block diagram in the case in which the signal processor 10 is implemented as a computer.

For example, in the case in which the signal processor 10 except the A/D converter 21 is implemented as a computer, the spectrum storage unit 23, the data storage unit 27 and the wind velocity model storage unit 28 can be configured on a memory 41 of the computer, a program in which the processes performed by the control unit 20, the spectrum calculating unit 22, the wind velocity calculating unit 24, the wind velocity model selecting unit 29, the wind velocity searching unit 30 and the display processing unit 31 are described can be stored in the memory 41, and a processor 42 of the computer can be made to execute the program stored in the memory 41.

Figure 4:
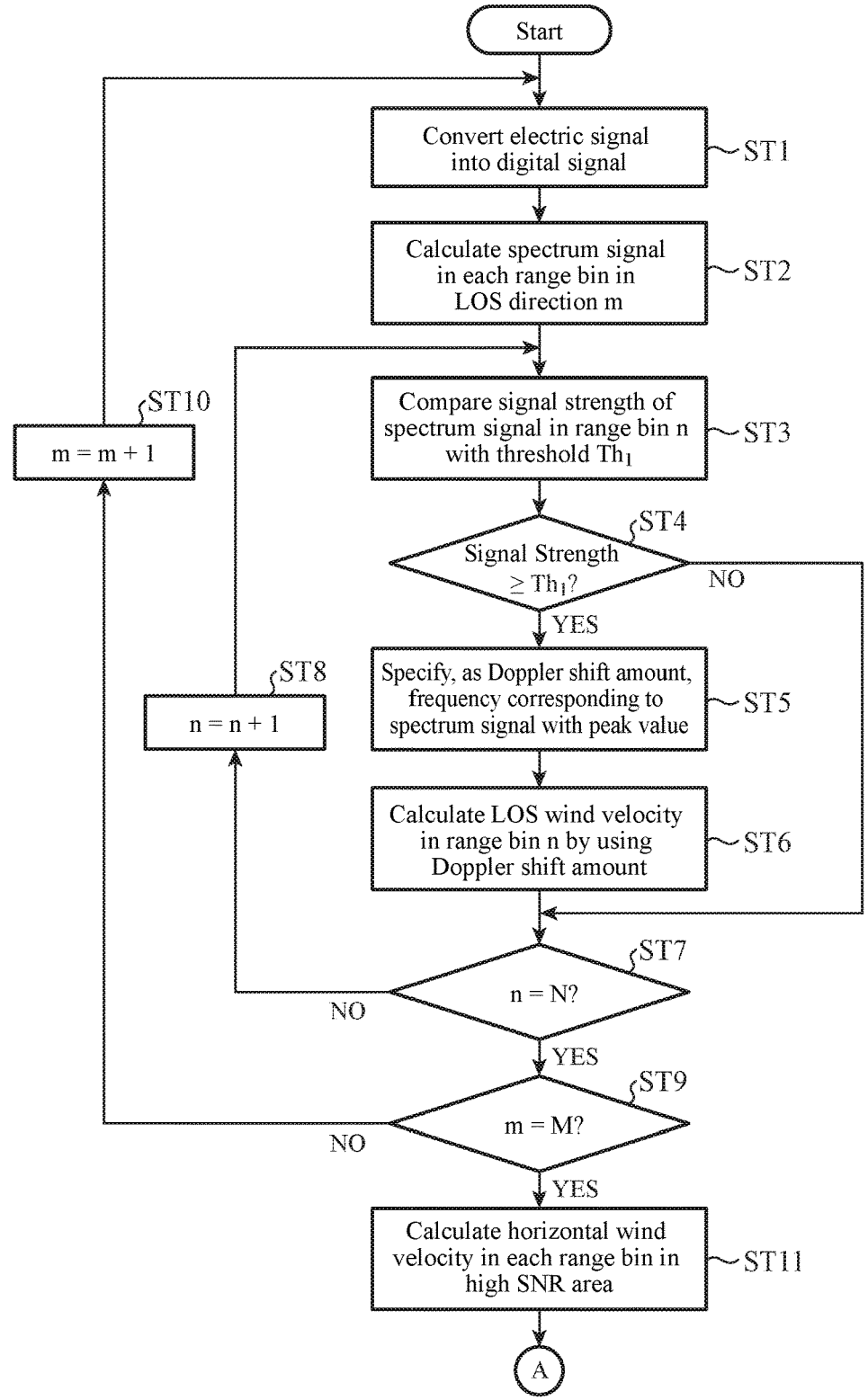
FIG. 4 is a flowchart showing a wind velocity observation method which corresponds to processing performed by the signal processor 10 of the laser radar apparatus according to Embodiment 1 of the present invention (a first half)
Figure 5:
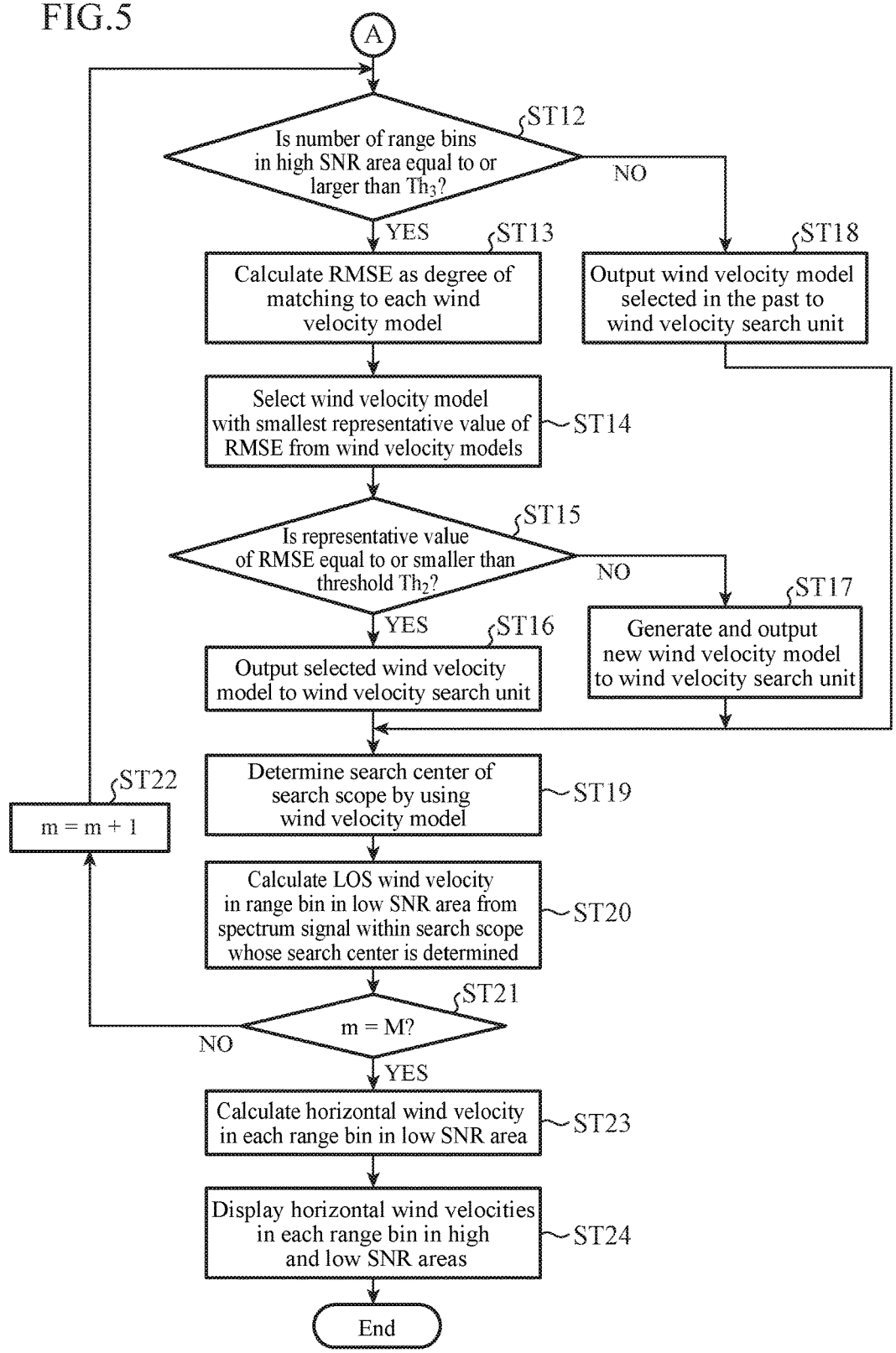
FIG. 5 is a flow chart showing the wind velocity observation method which corresponds to the processing performed by the signal processor 10 of the laser radar apparatus according to Embodiment 1 of the present invention (a second half)

FIGS. 4 and 5 are flow charts showing a wind velocity observation method which corresponds to the processing performed by the signal processor 10 of the laser radar apparatus according to Embodiment 1 of the present invention.

Figure 6:
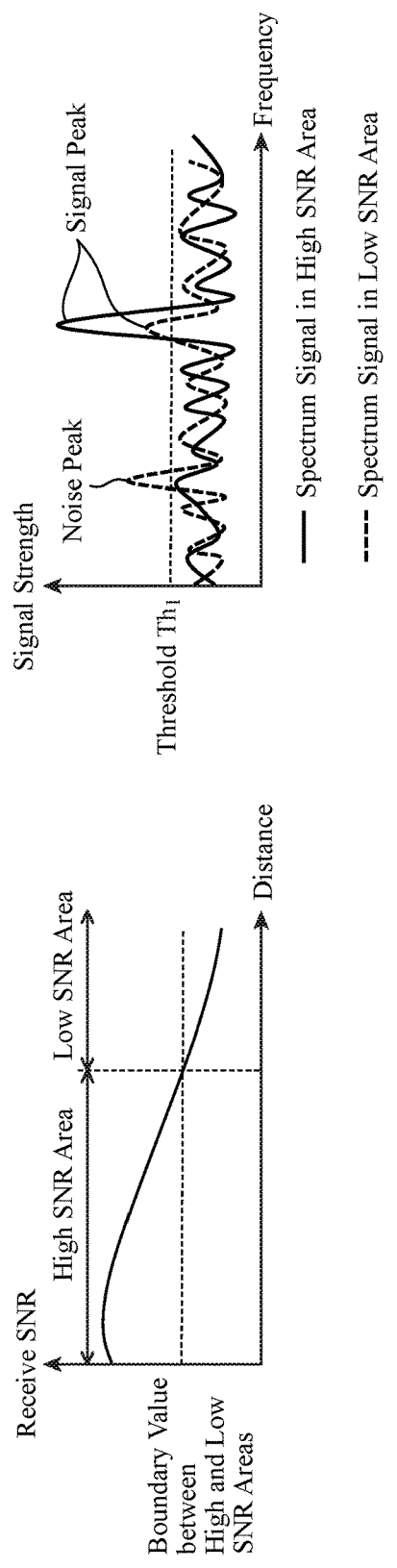
FIG. 6 is an explanatory drawing showing a spectrum signal in a high SNR area, and a spectrum signal in a low SNR area.

FIG. 6 is an explanatory drawing showing a spectrum signal in a high SNR area and a spectrum signal in a low SNR area.

While in the high SNR area, a wind velocity can be calculated correctly because the spectrum signal has a higher peak than noise, in the low SNR area, the peak of noise may be higher than the peak of the spectrum signal. Therefore, in the low SNR area, the peak of noise may be detected erroneously as the peak of the spectrum signal, and an incorrect wind velocity may be calculated.

As a method of preventing the peak of noise from being detected erroneously as the peak of the spectrum signal, a method of, instead of defining all frequencies as a search scope for the spectral peak, limiting the search scope for the spectral peak can be considered.

Figure 7:
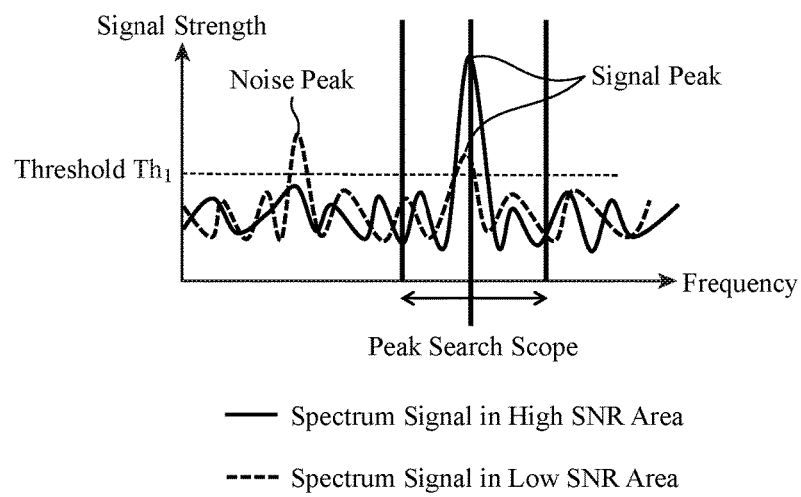
FIG. 7 is an explanatory drawing showing an example of determining a part of frequencies as a peak search scope (search scope), and searching for the peak of a spectrum signal within the peak search scope.

FIG. 7 is an explanatory drawing showing an example of determining a part of the frequencies as the peak search scope (search scope), and searching for the peak of the spectrum signal within the peak search scope.

By limiting the search scope for the spectral peak, as shown in FIG. 7, the probability that the peak of noise is detected erroneously as the peak of the spectrum signal is reduced.

Accordingly, in Embodiment 1, the laser radar apparatus that limits the search scope for the spectral peak will be explained.

However, when there is a possibility that the search center of the peak search scope which is the search scope for the spectral peak deviates greatly from the peak of the spectrum signal, it is necessary to determine a certain large search scope in order not to overlook the peak of the spectrum signal, even if the range within which to search for the peak of the spectrum signal is limited. When a large search scope is determined, the probability that the peak of noise is detected erroneously as the peak of the spectrum signal is increased.

Accordingly, in the laser radar apparatus according to Embodiment 1, a position close to the position of the peak of the spectrum signal is determined as the search center of the peak search scope, so that the search scope can be narrowed.

Next, operations will be explained.

The control unit 20 of the signal processor 10 outputs a control signal showing a pulse width of a pulse to be emitted, an amplification factor of the pulse, etc., to the optical modulation driver 3, and also outputs a control signal showing a LOS direction of a pulse to the LOS direction changing unit 11.

The control unit 20 further outputs the control signal showing the LOS direction of the pulse to the spectrum calculating unit 22 and the wind velocity calculating unit 24.

Suppose that the control unit 20 outputs a control signal showing LOS directions m (m=1, 2, ..., M) in Embodiment 1.

Also, suppose that the variable m showing the LOS direction is initially set to 1, and is incremented one by one until the variable m reaches M.

The optical oscillator 1 generates laser light.

The optical coupler 2 splits the laser light generated by the optical oscillator 1 into transmission light and local light, and outputs the transmission light to the optical modulator 4 and also outputs the local light to the receiving coupler 8.

When receiving the control signal from the control unit 20 of the signal processor 10, the optical modulation driver 3 controls the optical modulator 4 to perform pulse modulation so that a pulse with a pulse width shown by the control signal is provided, and also sets the amplification factor of the optical amplifier 5 to the one shown by the control signal.

The optical modulator 4 outputs a pulse to the optical amplifier 5 by performing pulse modulation on the transmission light outputted from the optical coupler 2 under the control of the optical modulation driver 3.

When receiving the pulse from the optical modulator 4, the optical amplifier 5 amplifies the pulse with the amplification factor set by the optical modulation driver 3, and outputs the pulse amplified thereby to the circulator 6.

When receiving the pulse from the optical amplifier 5, the circulator 6 outputs the pulse to the Tx/Rx optical system 7.

When receiving the control signal from the control unit 20 of the signal processor 10, the LOS direction changing unit 11 controls the Tx/Rx optical system 7 in such a way that the pulse is emitted in the LOS direction m shown by the control signal.

After emitting the pulse outputted from the circulator 6 in the LOS direction m, the Tx/Rx optical system 7 receives reflected light of the pulse which is reflected from an aerosol, which is an observation object, and returned back.

Here, it is contemplated that the LOS direction changing unit 11 changes the LOS direction m of the pulse in a mechanical manner by controlling a driving device that adjusts the direction of the Tx/Rx optical system 7, though plural Tx/Rx optical systems 7 having different LOS directions can be provided, an optical switch can be disposed between the plural Tx/Rx optical systems 7 and the circulator 6, and, when receiving a pulse from the circulator 6, the optical switch can output the pulse to a Tx/Rx optical system 7 corresponding to the LOS direction m shown by the control signal outputted from the control unit 20, among the plural Tx/Rx optical systems 7, and can output reflected light of the pulse which is received by the Tx/Rx optical system 7 corresponding to the LOS direction m to the circulator 6.

Instead, pulses can be emitted in plural LOS directions by preparing plural telescopes each including components from an optical oscillator 1 through a Tx/Rx optical system 7. Further, Embodiment 1 is not limited to the example of changing the LOS direction m of a pulse in a mechanical manner, and the LOS direction m of a pulse can be changed optically by using, for example, a wedge scanner.

Although in Embodiment 1, an example of changing the LOS direction m of a pulse in order to calculate a wind velocity which is the moving velocity of an aerosol from plural LOS wind velocities will be explained, it is not necessary to change the LOS direction of a pulse and therefore the LOS direction changing unit 11 is unnecessary when a wind velocity in a single LOS direction is defined as the moving velocity of an aerosol.

The circulator 6 outputs, as received light, reflected light of a pulse which is received by the Tx/Rx optical system 7 to the receiving coupler 8.

The receiving coupler 8 combines the local light outputted from the optical coupler 2 and the received light outputted from the circulator 6, thereby outputting combined light having a frequency which is the addition of the frequency of the local light and the frequency of the received light to the optical detector 9.

When receiving the combined light from the receiving coupler 8, the optical detector 9 converts the combined light into an electric signal and outputs the electric signal to the signal processor 10.

When receiving the electric signal from the optical detector 9, the signal processor 10 analyzes the electric signal, thereby calculating a wind velocity $V_W$ which is the moving velocity of an aerosol, and a wind direction Dir.

Hereafter, the details of the processing performed by the signal processor 10 will be explained concretely.

When receiving the electric signal from the optical detector 9, the A/D converter 21 of the signal processor 10 converts the electric signal into a digital signal (step ST1 of FIG. 4).

The spectrum calculating unit 22 calculates a spectrum signal in each of range bins in the LOS direction m whenever the LOS direction m is changed by the LOS direction changing unit 11 (step ST2).

More specifically, when receiving the digital signal from the A/D converter 21, the spectrum calculating unit 22 divides the digital signal into digital signals with respect to time, and performs a Fourier transform on each of the digital signals divided with respect to time, i.e., the digital signal in each of the range bins, thereby calculating a spectrum signal in each of the range bins in the LOS direction m.

In Embodiment 1, for the sake of expediency in explanation, it is contemplated that the number of range bins in the LOS direction m is N, and a variable showing a range bin is expressed by n (n=1, 2, . . . , N). It is contemplated that the variable n showing a range bin is initially set to 1, and is incremented one by one until the variable n reaches N.

The spectrum signal in each range bin n in the LOS direction m, which is calculated by the spectrum calculating unit 22, is stored in the spectrum storage unit 23.

Here, although it is contemplated that the spectrum signal in each of the range bins is stored in the spectrum storage unit 23, in order to improve the SNR of the spectrum signal in each of the range bins, the spectrum calculating unit 22 may perform an incoherent integrating process of adding spectrum signals in each of the range bins and a spectrum signal after the incoherent integration may be stored in the spectrum storage unit 23.

As already mentioned, while in the high SNR area, the peak of the spectrum signal is not detected erroneously and therefore a wind velocity can be calculated correctly, in the low SNR area, the peak of noise may be detected erroneously as the peak of the spectrum signal and an incorrect wind velocity may be calculated.

In the wind velocity calculating unit 24, the threshold $Th_1$ for determining whether the spectrum signal calculated by the spectrum calculating unit 22 belongs either the high SNR area or the low SNR area is set in advance.

The threshold $Th_1$ is used for classifying the spectrum signal calculated by the spectrum calculating unit 22 into either the high SNR area or the low SNR area. For example, by performing simulation calculations using a computer, a value which provides a normal detection probability of more than 99.9999% can be set. For example, the threshold $Th_1$ is set to 0.5 dB.

The LOS wind velocity calculating unit 25 of the wind velocity calculating unit 24 reads the spectrum signal in each of the range bins in the LOS direction m, which is stored in the spectrum storage unit 23, and compares the signal strength of the spectrum signal in the range bin n with the threshold $Th_1$ (step ST3).

When the signal strength of the spectrum signal in the range bin n is equal to or greater than the threshold $Th_1$ (YES in step ST4), the LOS wind velocity calculating unit 25 searches for a peak value of the spectrum signal and specifies, as a Doppler shift amount $f_d$, the frequency at which the spectrum signal has the peak value, because the spectrum signal belongs to the high SNR area and therefore the possibility that the peak of the spectrum signal is detected erroneously is low (step ST5).

After specifying the Doppler shift amount $f_d$, the LOS wind velocity calculating unit 25 calculates a LOS wind velocity $v_d$ in the range bin n from the Doppler shift amount $f_d$ and the wavelength λ of the pulse, as shown in the following expression (1) (step ST6).

$$v_d = f_d \lambda \quad (1)$$

The processes of steps ST3 to ST6 are repeatedly performed on all the range bins in the LOS direction m (steps ST7 and ST8).

Further, the processes of steps ST1 to ST8 are repeatedly performed until the LOS wind velocity $v_d$ in each of the range bins in the high SNR area in all LOS directions is calculated (steps ST9 and ST10).

The LOS wind velocity $v_d$ calculated by the LOS wind velocity calculating unit 25 is one in a range bin in the high SNR area, while a LOS wind velocity in a range bin in the low SNR area in which the signal strength of the spectrum signal is less than the threshold $Th_1$ is not calculated. A LOS wind velocity in a range bin in the low SNR area is calculated by the wind velocity searching unit 30.

Although in the embodiment the example in which the LOS wind velocity calculating unit 25 searches for the peak value of the spectrum signal and specifies, as the Doppler shift amount $f_d$, the frequency at which the spectrum signal has the peak value is shown, this is only an example. For example, the LOS wind velocity calculating unit can perform a centroid calculating process of calculating the centroid position of the spectrum signal, and specify, as a Doppler shift amount $f_d$, the frequency at which the spectrum signal has the centroid position.

It is contemplated in Embodiment 1 that the peak search scope within which the LOS wind velocity calculating unit 25 searches for the peak value of the spectrum signal is the whole frequency range. This is because if, instead of defining the whole frequency range as the peak search scope within which the LOS wind velocity calculating unit searches for the peak value of the spectrum signal, the peak search scope is limited to, for example, a range that depends on a wind velocity model stored in the wind velocity model storage unit 28, a wind velocity distribution acquired from the LOS wind velocities $v_d$ in all the range bins depends on the wind velocity model, and therefore a wind velocity distribution occurring now cannot be acquired.

After the LOS wind velocity calculating unit 25 calculates the LOS wind velocities $v_d$ in the range bins in the high SNR area in all LOS directions, the wind vector calculating unit 26 of the wind velocity calculating unit 24 performs a vector operation on plural LOS wind velocities $v_d$ whose number is M at the maximum, for each identical range bin, thereby calculating a horizontal wind velocity $V_W$ as the wind velocity in the range bin and also calculating a wind direction Dir in the range bin (step ST11). When all of the identical range bins in the M LOS directions belong to the high SNR area, a vector operation is performed on the M LOS wind velocities $v_d$. In contrast, when, for example, the identical range bins in two of the M LOS directions belong to the low SNR area, a vector operation is performed on the (M-2) LOS wind velocities $v_d$.

Hereafter, the process of calculating the horizontal wind velocity $V_W$ and the wind direction Dir in each of the range bins in the high SNR area, which is performed by the wind vector calculating unit 26, will be explained concretely.

The LOS wind velocity $v_d$ in each of the range bins which is calculated by the LOS wind velocity calculating unit 25 is expressed by the following expression (2).

$$v_d = U \sin \phi \sin \theta + V \cos \phi \sin \theta + W \cos \theta \tag{2}$$

In expression (2), $\phi$ denotes azimuth angle measured with respect to the north, $\theta$ denotes zenith angle, U denotes east-west direction wind velocity, V denotes north-south direction wind velocity, and W denotes vertical direction wind velocity.

Here, for the sake of expediency in explanation, assume that three LOS wind velocities $v_{d1}$, $v_{d2}$ and $v_{d3}$ in different LOS directions are calculated by the LOS wind velocity calculating unit 25. More specifically, assume that LOS wind velocities $v_{d1}$, $v_{d2}$ and $v_{d3}$ in the cases of m=1, 2 and 3 are calculated.

$$v_{d1} = U \sin \phi_1 \sin \theta_1 + V \cos \phi_1 \sin \theta_1 + W \cos \theta_1 \tag{3}$$

$$v_{d2} = U \sin \phi_2 \sin \theta_2 + V \cos \phi_2 \sin \theta_2 + W \cos \theta_2 \tag{4}$$

$$v_{d3} = U \sin \phi_3 \sin \theta_3 + V \cos \phi_3 \sin \theta_3 + W \cos \theta_3 \tag{5}$$

Expressions (3) to (5) can be rewrote as the following expression (6) using a matrix expression.

$$\begin{bmatrix} v_{d1} \\ v_{d2} \\ v_{d3} \end{bmatrix} = \begin{bmatrix} \sin\phi_1\sin\theta_1 & \cos\phi_1\sin\theta_1 & \cos\theta_1 \\ \sin\phi_2\sin\theta_2 & \cos\phi_2\sin\theta_2 & \cos\theta_2 \\ \sin\phi_3\sin\theta_3 & \cos\phi_3\sin\theta_3 & \cos\theta_3 \end{bmatrix} \begin{bmatrix} U \\ V \\ W \end{bmatrix} \tag{6}$$

$$\begin{bmatrix} U \\ V \\ W \end{bmatrix} = A^{-1} \begin{bmatrix} v_{d1} \\ v_{d2} \\ v_{d3} \end{bmatrix}$$

$$A = \begin{bmatrix} A_{11} & A_{12} & A_{13} \\ A_{21} & A_{22} & A_{23} \\ A_{31} & A_{32} & A_{33} \end{bmatrix} = \begin{bmatrix} \sin\phi_1\sin\theta_1 & \cos\phi_1\sin\theta_1 & \cos\theta_1 \\ \sin\phi_2\sin\theta_2 & \cos\phi_2\sin\theta_2 & \cos\theta_2 \\ \sin\phi_3\sin\theta_3 & \cos\phi_3\sin\theta_3 & \cos\theta_3 \end{bmatrix}$$

$$A^{-1} = \frac{1}{|A|} \begin{bmatrix} A_{22}A_{33} - A_{23}A_{32} & A_{13}A_{32} - A_{12}A_{33} & A_{12}A_{23} - A_{13}A_{22} \\ A_{23}A_{31} - A_{21}A_{33} & A_{11}A_{33} - A_{13}A_{31} & A_{13}A_{21} - A_{11}A_{23} \\ A_{21}A_{32} - A_{22}A_{31} & A_{12}A_{11} - A_{11}A_{32} & A_{11}A_{22} - A_{12}A_{21} \end{bmatrix}$$

$$|A| = A_{11}A_{22}A_{33} + A_{12}A_{23}A_{31} + A_{13}A_{21}A_{32} - A_{13}A_{22}A_{13} - A_{11}A_{23}A_{32} - A_{12}A_{21}A_{33}$$

U, V and W are expressed by the following expression (7) by solving expression (6) for U, V and W.

$$U = \frac{1}{|A|}\{(A_{22}A_{33} - A_{23}A_{32})v_1 + \tag{7}$$

$$(A_{13}A_{32} - A_{12}A_{33})v_2 + (A_{12}A_{23} - A_{13}A_{22})v_3\}$$

$$V = \frac{1}{|A|}\{(A_{23}A_{31} - A_{21}A_{33})v_1 + (A_{11}A_{33} - A_{13}A_{31})v_2 +$$

$$(A_{13}A_{21} - A_{11}A_{23})v_3\}$$

$$W = \frac{1}{|A|}\{(A_{21}A_{32} - A_{22}A_{31})v_1 + (A_{12}A_{11} - A_{11}A_{32})v_2 +$$

$$(A_{11}A_{22} - A_{12}A_{21})v_3\}$$

The wind vector calculating unit 26 calculates the horizontal wind velocity $V_W$ and the wind direction Dir in the range bin in the high SNR area by using the east-west direction wind velocity U and the north-south direction wind velocity V, as shown in the following expressions (8) and (9).

$$V_w = \sqrt{U^2 + V^2} / \cos(\alpha) \tag{8}$$

$$Dir = atan\left(\frac{U}{V}\right) \times \frac{180}{\pi} \tag{9}$$

In expression (8), $\alpha$ denotes an angle of elevation (an angle which the front direction of the laser radar apparatus forms with respect to the ground surface).

Although in the embodiment the example in which the wind vector calculating unit 26 calculates the horizontal wind velocity $V_W$ by using the east-west direction wind velocity U and the north-south direction wind velocity V is shown, this is only an example, and the wind vector calculating unit can alternatively calculate the horizontal wind velocity $V_W$ by using another method.

The horizontal wind velocity $V_W$ and the wind direction Dir in the range bin in the high SNR area which are calculated by the wind vector calculating unit 26 are stored in the data storage unit 27.

The wind velocity model storage unit 28 stores, as the wind velocity models each showing a relationship between altitudes and wind velocities in the atmosphere, for example, the "downburst model", the "power-law model" and the "wind shear model."

FIG. 8 is an explanatory drawing showing the downburst model, the power-law model and the wind shear model.

The wind velocity model selecting unit 29 initializes the variable m showing the LOS direction to 1, and, when the number of range bins in the high SNR area in the LOS direction m, i.e., the number of range bins for each of which the horizontal wind velocity $V_W$ and the wind direction Dir are calculated by the wind vector calculating unit 26 is equal to or larger than $Th_3$ (third threshold) (YES in step ST12), calculates the degree of matching to each of the plural wind velocity models stored in the wind velocity model storage unit 28 from the horizontal wind velocities $V_W$ in the range bins in the high SNR area stored in the data storage unit 27 (step ST13).

The threshold $Th_3$ is preset by the user, and, for example, it is contemplated that in consideration of the resolution of altitudes (distances), the threshold $Th_3$ is set to a value adequate to detect variations in the wind velocity. For example, the threshold $Th_3$ is set to 10.

In Embodiment 1, an example in which, as the degree of matching to each of the wind velocity models, an RMSE shown in the following expression (10) is calculated will be explained. The RMSE is an evaluated value which becomes small as the degree of matching to the wind velocity model becomes high.

$$RMSE = \sqrt{\frac{1}{N} \Sigma (V_W(z) - fm(z))^2} \qquad (10)$$

In expression (10), $V_W(z)$ denotes the horizontal wind velocity at a time when the range bin (altitude) calculated by the wind vector calculating unit 26 is z, and fm(z) denotes the horizontal wind velocity which is acquired from a wind velocity model at a time when the range bin (altitude) is z.

Further, N denotes the number of range bins in the LOS direction m for each of which the horizontal wind velocity $V_W$ and the wind direction Dir are calculated by the wind vector calculating unit 26.

The horizontal wind velocity fm(z) acquired from a wind velocity model depend on the wind velocity model, as a matter of course. For example, in the case of the power-law wind velocity model, the horizontal wind velocity is expressed by the following expression (11).

$$fm(z) = u \times z_0 \left(\frac{z}{z_0}\right)^p \qquad (11)$$

In expression (11), u denotes the wind velocity at a reference altitude $z_0$. It is preferable to use, for example, the wind velocity (horizontal wind velocity $V_W(z)$) calculated by the wind vector calculating unit 26) in the range bin with the lowest altitude among the range bins in the high SNR area.

A parameter (variable) of each wind velocity model is denoted by p.

For each of the wind velocity models stored in the wind velocity model storage unit 28, the wind velocity model selecting unit 29 calculates the RMSE given by expression (10) while changing the parameter p of the wind velocity model, and specifies the minimum value of the RMSE. Hereafter, the minimum value of the RMSE is defined as a representative value of the RMSE.

After specifying the representative values of the RMSE for all the wind velocity models stored in the wind velocity model storage unit 28, the wind velocity model selecting unit 29 compares the representative values of the RMSE of all the wind velocity models with one another, and selects a wind velocity model with the smallest representative value of the RMSE from among the plural wind velocity models stored in the wind velocity model storage unit 28 (step ST14). The wind velocity model with the smallest representative value of the RMSE is the one with the highest degree of matching among the plural wind velocity models.

After selecting the wind velocity model with the smallest representative value of the RMSE, the wind velocity model selecting unit 29 compares the representative value of the RMSE with a preset threshold $Th_2$, and, when the representative value of the RMSE is equal to or smaller than the threshold $Th_2$ (YES in step ST15), outputs the selected wind velocity model to the wind velocity searching unit 30 (step ST16). The fact that the representative value of the RMSE is equal to or smaller than the threshold $Th_2$ means that the degree of matching to the wind velocity model is equal to or greater than a second threshold, and the threshold $Th_2$ corresponds to the second threshold.

When the representative value of the RMSE is larger than the threshold $Th_2$ (No in step ST15), the wind velocity model selecting unit 29 generates a new wind velocity model and outputs the wind velocity model to the wind velocity searching unit 30 because there is a possibility that there occurs a natural phenomenon which is not represented by any of the plural wind velocity models stored in the wind velocity model storage unit 28, i.e., the wind velocity models set as standard (step ST17).

For example, by generating an approximate polynomial according to the least square method by using the horizontal wind velocities $V_W$ in the range bins in the high SNR area which are calculated by the wind vector calculating unit 26, a new wind velocity model is generated. More specifically, a wind velocity model expressed by an approximate polynomial is generated using the horizontal wind velocities $V_W$ in the range bins in the high SNR area.

On the other hand, because it is difficult to generate a new wind velocity model with a high degree of accuracy when the number of range bins in the LOS direction m for each of which the horizontal wind velocity $V_W$ and the wind direction Dir are calculated by the wind vector calculating unit 26 is smaller than the threshold $Th_3$ (No in step ST12), the wind velocity model selecting unit 29 outputs a wind velocity model which the wind velocity model selecting unit selected in the past to the wind velocity searching unit 30 (step ST18). As the wind velocity model selected in the past, for example, the wind velocity model which the wind velocity model selecting unit selected the last time is generated to the wind velocity searching unit 30.

When, in the spectrum signals in the range bins calculated by the spectrum calculating unit 22, a spectrum signal in a range bin in the low SNR area, i.e., a spectrum signal in a range bin having a signal strength less than the threshold $Th_1$ exists, the wind velocity searching unit 30 determines a search center IF of the search scope for a Doppler frequency corresponding to a wind velocity in the range bin in the low SNR area by using the wind velocity model outputted from the wind velocity model selecting unit 29 (step ST19).

More specifically, when the range bin (altitude) in the low SNR area is z, the wind velocity searching unit 30 acquires the horizontal wind velocity fm(z) and the wind direction Dir(z) which correspond to z from the wind velocity model outputted from the wind velocity model selecting unit 29 and substitutes the horizontal wind velocity fm(z) and the wind direction Dir(z) into the following expression (12), thereby calculating the search center IF of the preset search scope.

$$IF = \frac{fm(z) \times \cos(Dir(z) - \emptyset) \times \sin\theta}{\lambda} \qquad (12)$$

FIG. 9 is an explanatory drawing showing the search center IF determined by the wind velocity searching unit 30.

Figure 9A:
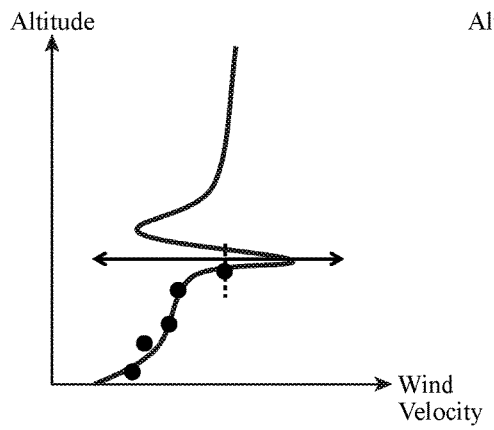
FIGS. 9A and 9B are explanatory drawings to explain a search center IF determined by a wind velocity searching unit 30.

FIG. 9A shows an example in which the search scope is determined using the method disclosed in Patent Literature 3. More specifically, an example in which the search scope is determined using a standard deviation of wind velocities is shown. However, because the search center IF of the search scope is not determined, it is necessary to determine a certain large search scope even if the search scope is limited. Therefore, the probability that the peak of noise is detected erroneously as the peak of a spectrum signal is increased.

Figure 9B:
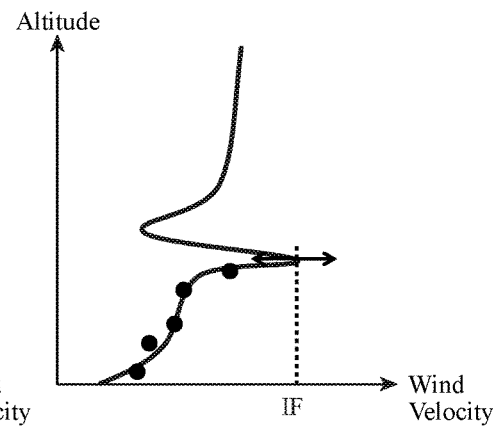

FIG. 9B shows an example of the search center IF determined by the wind velocity searching unit 30, and the center of the search scope matches the search center IF in this example.

It is contemplated that the search scope shown in FIG. 9B has a preset fixed size.

It is desirable to set this search scope independently of any wind velocity model, in consideration of the broadening of a spectrum in the high SNR area. In Embodiment 1, because the search center IF of the search scope is optimized, it is possible to detect the peak of a spectrum signal without extending the search scope.

After calculating the search center IF of the search scope, the wind velocity searching unit 30 searches for the wind velocity in the range bin in the low SNR area from the spectrum signal within the search scope whose search center IF is determined (step ST20).

More specifically, the wind velocity searching unit 30 searches for the peak value of the spectrum signal within the search scope whose search center IF is determined, and specifies, as the Doppler shift amount $f_d$, the frequency at which the spectrum signal has the peak value.

After specifying the Doppler shift amount $f_d$, the wind velocity searching unit 30 calculates the LOS wind velocity $v_d$ in the range bin in the low SNR area from the Doppler shift amount $f_d$ and the wavelength λ of the pulse, as shown in the above-mentioned expression (1), and outputs the LOS wind velocity $v_d$ to the wind vector calculating unit 26 of the wind velocity calculating unit 24.

The processes of steps ST12 to ST20 are repeatedly performed until the LOS wind velocity $v_d$ in each of the range bins in the low SNR area in all LOS directions is calculated (steps ST21 and ST22).

When receiving the LOS wind velocities $v_d$ in the range bins in the low SNR area from the wind velocity searching unit 30, the wind vector calculating unit 2 performs a vector operation on plural LOS wind velocities $v_d$ whose number is M at the maximum, for each identical range bin, thereby calculating a horizontal wind velocity $V_W$ as the wind velocity in the range bin and also calculating a wind direction Dir, like in the case of receiving the LOS wind velocities $v_d$ in the range bins in the high SNR area from the LOS wind velocity calculating unit 25 (step ST23). When all of the identical range bins in the M LOS directions belong to the low SNR area, a vector operation is performed on the M LOS wind velocities $v_d$. In contrast, when, for example, the identical range bin in one of the M LOS directions belongs to the high SNR area, a vector operation is performed on the (M-1) LOS wind velocities $v_d$.

The horizontal wind velocities $V_W$ and the wind directions Dir in the range bins in the low SNR area which are calculated by the wind vector calculating unit 26 are stored in the data storage unit 27.

The display processing unit 31 reads the horizontal wind velocity $V_W$ and the wind direction Dir in each of the range bins in the high SNR area and those in the low SNR area which are stored in the data storage unit 27, and displays the horizontal wind velocity $V_W$ and the wind direction Dir in each of the range bins in the high SNR area and those in the low SNR area on a display (step ST24).

As can be seen from the above description, according to Embodiment 1, because the wind velocity searching unit 30 is configured so as to, when a spectrum signal calculated by the spectrum calculating unit 22 is one in a range bin having a signal strength less than the threshold $Th_1$, determine the search center IF of the search scope for a Doppler frequency corresponding to a wind velocity in the range bin by using a wind velocity model selected by the wind velocity model selecting unit 29, and search for the wind velocity in the range bin from the spectrum signal within the search scope whose search center IF is determined thereby, there is provided an advantage of being able to reduce the probability that the peak of noise is detected erroneously as the peak of the spectrum signal, and calculate the wind velocity with a high degree of accuracy. There is provided another advantage of being able to lengthen the measurable distance of wind velocities.

Embodiment 2

In above-mentioned Embodiment 1, the example in which when the number of range bins in the high SNR area for each of which the horizontal wind velocity $V_W$ and the wind direction Dir are calculated by the wind vector calculating unit 26 is smaller than the threshold $Th_3$, the wind velocity model selecting unit 29 outputs a wind velocity model selected in the past to the wind velocity searching unit 30 because it is difficult to generate a new wind velocity model with a high degree of accuracy is shown. Instead, after the optical modulation driver 3 and the spectrum calculating unit 22 are controlled in such a way that the number of range bins in the high SNR area is increased, the wind vector calculating unit 26 can calculate a horizontal wind velocity $V_W$ and a wind direction Dir in each of the range bins in the high SNR area so as not to output any wind velocity model selected in the past to the wind velocity searching unit 30.

Figure 10:
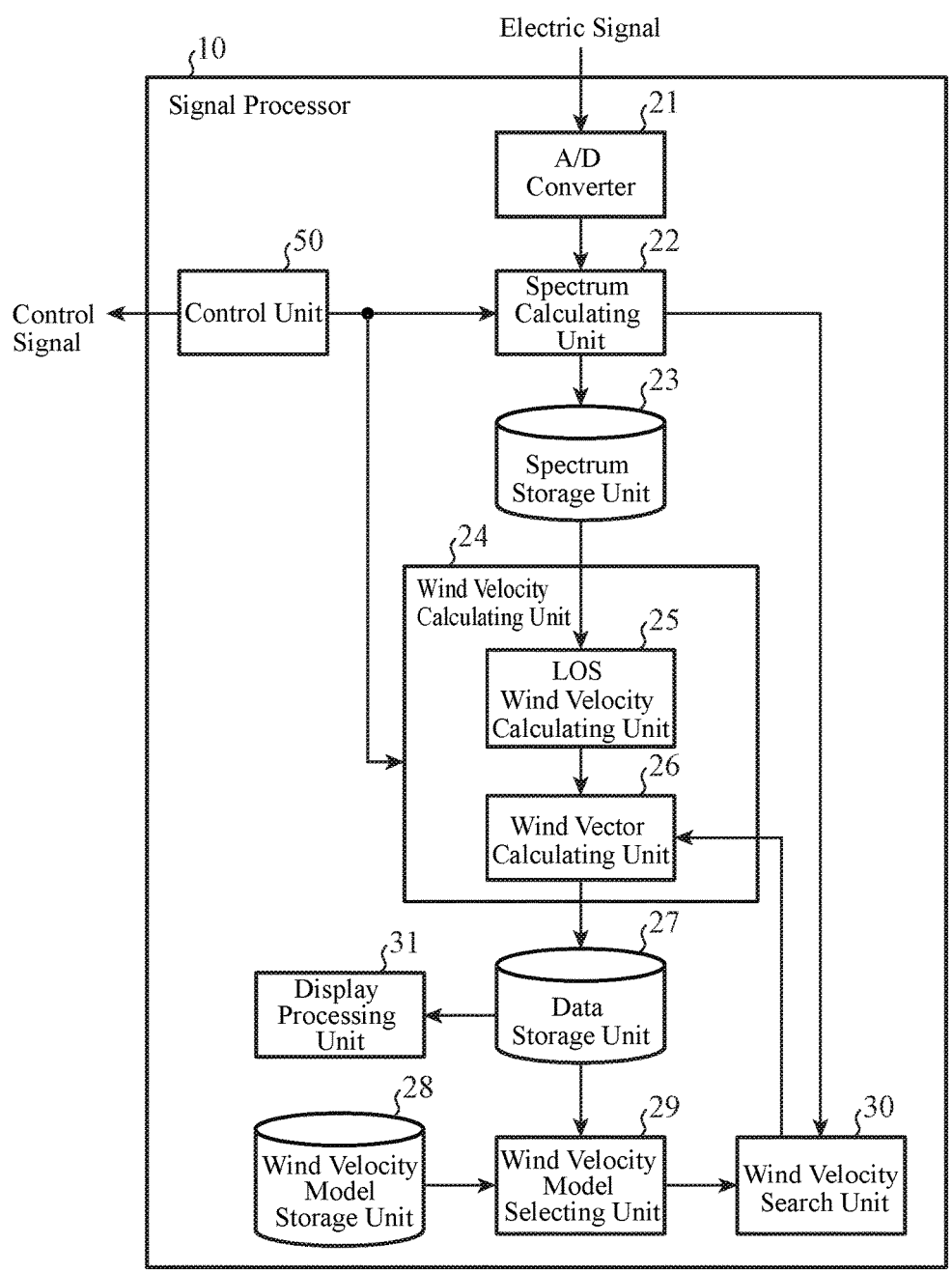
FIG. 10 is a block diagram showing a signal processor 10 of a laser radar apparatus according to Embodiment 2 of the present invention.

FIG. 10 is a block diagram showing a signal processor 10 of a laser radar apparatus according to Embodiment 2 of the present invention. In FIG. 10, because the same reference numerals as those shown in FIG. 2 denote the same components or like components, the explanation of the components will be omitted hereafter.

A control unit 50 outputs a control signal showing the pulse width of a pulse to be emitted, the amplification factor of the pulse, etc. to an optical modulation driver 3, like the control unit 20 shown in FIG. 2, and also outputs a control signal showing the LOS direction of the pulse to a LOS direction changing unit 11. The control unit 50 further outputs the control signal showing the LOS direction of the pulse to a spectrum calculating unit 22 and a wind velocity calculating unit 24.

When the number of range bins in a high SNR area in the LOS direction m for each of which a horizontal wind velocity $V_W$ and a wind direction Dir are calculated by a wind vector calculating unit 26 is smaller than a threshold $Th_3$, the control unit 50 outputs a control signal for instructing enlargement of the pulse width of a pulse to be emitted from a Tx/Rx optical system 7 to the optical modulation driver 3, unlike the control unit 20 shown in FIG. 2. Instead, the control unit 50 outputs a control signal that instructs an increase in the number of times of the incoherent integrating process, which adds spectrum signals in each of the range bins, to the spectrum calculating unit 22.

In the example of FIG. 10, it is contemplated that each of the following components: the control unit 50, the spectrum calculating unit 22, the wind velocity calculating unit 24, a wind velocity model selecting unit 29, a wind velocity searching unit 30 and a display processing unit 31, which are components of the signal processor 10, is implemented as hardware for exclusive use. As the hardware for exclusive use, for example, a semiconductor integrated circuit equipped with a CPU, a one chip microcomputer or the like can be considered.

Instead, the signal processor 10 may be implemented as a computer.

For example, in the case in which the signal processor 10 except an A/D converter 21 is implemented as a computer, a spectrum storage unit 23, a data storage unit 27 and a wind velocity model storage unit 28 can be configured on a memory 41 shown in FIG. 3 of the computer, a program in which the processes performed by the control unit 50, the spectrum calculating unit 22, the wind velocity calculating unit 24, the wind velocity model selecting unit 29, the wind velocity searching unit 30 and the display processing unit 31 are described can be stored in the memory 41, and a processor 42 of the computer can be made to execute the program stored in the memory 41.

Next, operations will be explained.

In above-mentioned Embodiment 1, when the number of range bins in the high SNR area in the LOS direction m for each of which the horizontal wind velocity $V_W$ and the wind direction Dir are calculated by the wind vector calculating unit 26 is smaller than the threshold $Th_3$, the wind velocity model selecting unit 29 outputs a wind velocity model selected in the past to the wind velocity searching unit 30.

Although in this case the wind velocity searching unit 30 calculates a LOS wind velocity $v_d$ in a range bin in a low SNR area by using a wind velocity model selected in the past, there is a possibility that the calculation accuracy of the LOS wind velocity $v_d$ degrades because the wind velocity model selected in the past does not necessarily represent a current wind velocity distribution.

On the other hand, if the optical modulation driver 3 and the spectrum calculating unit 22 can be controlled in such a way that the number of range bins in the high SNR area is increased, the number of range bins in the high SNR area for each of which the horizontal wind velocity $V_W$ is calculated by the wind vector calculating unit 26 can be increased. When the number of range bins in the high SNR area is increased, the wind velocity model selecting unit 29 can generate a new wind velocity model with a high degree of accuracy by using the horizontal wind velocities $V_W$ in the range bins in the high SNR area. Instead, the wind velocity model selecting unit 29 can select a wind velocity model with the highest degree of matching from plural wind velocity models stored in the wind velocity model storage unit 28.

Therefore, in Embodiment 2, when the number of range bins in the high SNR area in the LOS direction m for each of which the horizontal wind velocity $V_W$ and the wind direction Dir are calculated by the wind vector calculating unit 26 is smaller than the threshold $Th_3$, the control unit 50 controls the optical modulation driver 3 and the spectrum calculating unit 22 in such a way that the number of range bins in the high SNR area is increased.

Concretely, the control unit 50 outputs a control signal for instructing enlargement of the pulse width of a pulse to be emitted from the Tx/Rx optical system 7 to the optical modulation driver 3.

When receiving the control signal for instructing enlargement of the pulse width from the control unit 50, the optical modulation driver 3 controls the pulse modulation by the optical modulator 4 in such a way that the pulse width is enlarged. As a result, because the pulse width of the pulse emitted from the Tx/Rx optical system 7 is enlarged, the SNR of reflected light becomes high. Although the enlargement of the pulse width causes a decrease in the distance resolution, an altitude (distance) up to which wind measurements can be performed can be increased by setting the focus position of the Tx/Rx optical system 7 to be a distant position. When enlarging the pulse width, the control unit 50 can change the amplification factor of an optical amplifier 5 simultaneously.

Further, the control unit 50 can output a control signal for instructing an increase in the number of times that the incoherent integrating process of adding spectrum signals in each of the range bins is to be performed to the spectrum calculating unit 22.

When receiving the control signal for instructing an increase in the number of times that the incoherent integrating process is to be performed, the spectrum calculating unit 22 increases the number of times that the incoherent integrating process of adding spectrum signals in each of the range bins is to be performed. Because the SNR becomes high even by increasing the number of times that the incoherent integrating process is to be performed, the number of range bins in the high SNR area can be increased.

However, because the number of times that the incoherent integrating process is to be performed cannot be increased to an unlimited extent, and an upper limit on the number of times that the incoherent integrating process is to be performed is set dependently on a time period during which the precondition that winds are uniform does not break, the number of times that the incoherent integrating process is to be performed can be increased within a range that does not exceed the upper limit.

In the state in which the number of range bins in the high SNR area has been increased, the signal processor 10 performs a process of calculating the horizontal wind velocity $V_W$, like that according to above-mentioned Embodiment 1.

At this time, when the number of range bins in the high SNR area is increased and then becomes equal to or larger than the threshold $Th_3$, the wind velocity model selecting unit 29 can generate a new wind velocity model with a high degree of accuracy by using the horizontal wind velocities $V_W$ in the range bins in the high SNR area and output the new wind velocity model to the wind velocity searching unit 30, without outputting a wind velocity model selected in the past to the wind velocity searching unit 30. Instead, the wind velocity model selecting unit 29 can select a wind velocity model with the highest degree of matching from the plural wind velocity models stored in the wind velocity model storage unit 28, and output the wind velocity model to the wind velocity searching unit 30.

As can be seen from the above description, according to Embodiment 2, because the control unit 50 is configured so as to, when the number of range bins in the high SNR area in the LOS direction m for each of which the horizontal wind velocity $V_W$ and the wind direction Dir are calculated by the wind vector calculating unit 26 is smaller than the threshold $Th_3$, output the control signal for instructing enlargement of the pulse width of a pulse to be emitted from the Tx/Rx optical system 7 to the optical modulation driver 3, or output the control signal for instructing an increase in the number of times that the incoherent integrating process of adding spectrum signals in each of the range bins is to be performed to the spectrum calculating unit 22, there is provided an advantage of being able to increase the number of range bins in the high SNR area in a situation in which the number of range bins in the high SNR area is small, thereby improving the calculation accuracy of the horizontal wind velocity $V_W$.

Note that any combination of two or more of the above-mentioned embodiments can be made, various changes can be made to any component of the above-mentioned embodiments, and omission of any component of the above-mentioned embodiments can be made within the scope of the invention.

INDUSTRIAL APPLICABILITY

The laser radar apparatus according to the present invention is suitable for use as a laser radar apparatus that, when observing a wind velocity in the atmosphere, needs to reduce the probability that the peak of noise is detected erroneously as the peak of a spectrum signal.

REFERENCE SIGNS LIST

1 optical oscillator, 2 optical coupler, 3 optical modulation driver, 4 optical modulator, 5 optical amplifier, 6 optical circulator, 7 transmission and reception (Tx/Rx) optical system, 8 receiving coupler, 9 optical detector, 10 signal processor, 11 LOS direction changing unit, 20 control unit, 21 A/D converter, 22 spectrum calculating unit, 23 spectrum storage unit, 24 wind velocity calculating unit, 25 LOS wind velocity calculating unit, 26 wind vector calculating unit, 27 data storage unit, 28 wind velocity model storage unit, 29 wind velocity model selecting unit, 30 wind velocity searching unit, 31 display processing unit, 41 memory, 42 processor, and 50 control unit.

The invention claimed is:
1. A laser radar apparatus comprising:
a transmission and reception optical system for emitting a pulse into an atmosphere, and receiving reflected light of the pulse that is reflected from an observation object and returned back;
a spectrum calculating unit for calculating a spectrum signal in range bins from the reflected light received by the transmission and reception optical system;
a wind velocity calculating unit for, when a signal strength in a range bin for which a spectrum signal that is calculated by the spectrum calculating unit is equal to or greater than a first threshold, calculating a wind velocity in the range bin which is a velocity of the observation object from the spectrum signal;
a wind velocity model selecting unit for selecting a wind velocity model corresponding to wind velocities in the range bins that are calculated by the wind velocity calculating unit from a plurality of wind velocity models each showing a relationship between range bins and wind velocities in the atmosphere; and
a wind velocity searching unit for, when a signal strength in a range bin for which a spectrum signal that is calculated by the spectrum calculating unit is less than the first threshold, determining a search center of a search scope for a Doppler frequency corresponding to a wind velocity in the range bin by using the wind velocity model selected by the wind velocity model selecting unit, and searching for a wind velocity in the range bin from the spectrum signal within the search scope whose search center is determined.

2. The laser radar apparatus according to claim 1, further comprising:
a line-of-sight direction changing unit for changing a line of sight which is a direction of a pulse to be emitted from the transmission and reception optical system, wherein
the spectrum calculating unit calculates, whenever the line of sight is changed by the line-of-sight direction changing unit, a spectrum signal in range bins for each line of sight from the reflected light received by the transmission and reception optical system, and,
the wind velocity calculating unit, whenever the line of sight is changed by the line-of-sight direction changing unit, when a signal strength in a range bin for which a spectrum signal calculated by the spectrum calculating unit is equal to or greater than the first threshold, calculates a line-of-sight wind velocity in the range bin from the spectrum signal calculated by the spectrum calculating unit, and calculates a wind velocity in the range bin from a plurality of line-of-sight wind velocities in the range bins of interest in each line of sight.

3. The laser radar apparatus according to claim 1, wherein the wind velocity model selecting unit calculates degrees of matching to the plural wind velocity models from wind velocities in each range bin which are calculated by the wind velocity calculating unit, compares the degrees of matching to the plural wind velocity models with one another, and selects a wind velocity model corresponding to the wind velocities in each range bin on a basis of a result of the comparison of the degrees of matching.

4. The laser radar apparatus according to claim 3, wherein when there is no degree of matching equal to or greater than a second threshold in the degrees of matching to the plural wind velocity models, the wind velocity model selecting unit generates a new wind velocity model by using wind velocities in range bins which are calculated by the wind velocity calculating unit, and, when a signal strength in a range bin for which a spectrum signal that is calculated by the spectrum calculating unit is less than the first threshold, the wind velocity searching unit determines a search center of a search scope for a Doppler frequency corresponding to a wind velocity in the range bin by using the new wind velocity model generated by the wind velocity model selecting unit, and searches for a wind velocity in the range bin from the spectrum signal within the search scope whose search center is determined.

5. The laser radar apparatus according to claim 3, further comprising:
a control unit for outputting, when the number of range bins for which a wind velocity is calculated by the wind velocity calculating unit is smaller than a third threshold, either an instruction to enlarge a pulse width of a pulse to be emitted from the transmission and reception optical system or an instruction to increase the number of times that a process of integration to be performed on spectrum signals calculated by the spectrum calculating unit for improving a signal to noise ratio of spectrum signal.

6. A wind velocity observation method comprising:
by a transmission and reception optical system, emitting a pulse into an atmosphere, and receiving reflected light of the pulse that is reflected by an observation object and returned back;
by a spectrum calculating unit, calculating a spectrum signal in range bins from the reflected light received by the transmission and reception optical system;
by a wind velocity calculating unit, when a signal strength in a range bin for which a spectrum signal that is calculated by the spectrum calculating unit is equal to or greater than a first threshold, calculating a wind velocity in the range bin which is a velocity of the observation object from the spectrum signal;
by a wind velocity model selecting unit, selecting a wind velocity model corresponding to wind velocities in the range bins that are calculated by the wind velocity calculating unit from a plurality of wind velocity models each showing a relationship between range bins and wind velocities in the atmosphere; and by a wind velocity searching unit, when a signal strength in a range bin for which a spectrum signal that is calculated by the spectrum calculating unit is less than the first threshold, determining a search center of a search scope for a Doppler frequency corresponding to a wind velocity in the range bin by using the wind velocity model selected by the wind velocity model selecting unit, and searching for a wind velocity in the range bin from the spectrum signal within the search scope whose search center is determined.

* * * * *